(12) United States Patent
Herrig et al.

(10) Patent No.: US 11,499,532 B2
(45) Date of Patent: Nov. 15, 2022

(54) NACELLE ASSEMBLY FOR A WIND TURBINE

(71) Applicant: GENERAL ELECTRIC RENOVABLES ESPAÑA, S.L., Barcelona (ES)

(72) Inventors: Andreas Herrig, Garching (DE); Santiago Tomas Monpol, Barcelona (ES); Benjamin Patrick Hallissy, Greenville, SC (US)

(73) Assignee: General Electric Renovables Espana, S.L., Barcelona (ES)

( * ) Notice: Subject to any disclaimer, the term of this patent is extended or adjusted under 35 U.S.C. 154(b) by 29 days.

(21) Appl. No.: 16/940,790

(22) Filed: Jul. 28, 2020

(65) Prior Publication Data

US 2021/0033075 A1 Feb. 4, 2021

(30) Foreign Application Priority Data

Jul. 31, 2019 (EP) .................................... 19382666

(51) Int. Cl.
*F03D 80/00* (2016.01)
*F03D 13/10* (2016.01)

(52) U.S. Cl.
CPC ............. *F03D 80/00* (2016.05); *F03D 13/10* (2016.05); *F05B 2240/14* (2013.01); *F05B 2270/321* (2013.01)

(58) Field of Classification Search
CPC ..... F03D 7/0204; F03D 80/00; F05B 2240/14
See application file for complete search history.

(56) References Cited

U.S. PATENT DOCUMENTS

| 8,037,748 | B2* | 10/2011 | Enevoldsen ......... A61K 9/2018 |
| | | | 73/170.01 |
| 9,512,823 | B2* | 12/2016 | Nyvad ..................... F03D 80/80 |
| 9,869,298 | B2* | 1/2018 | Rosenvard ................ F03D 7/04 |
| 2007/0009348 | A1* | 1/2007 | Chen ......................... F03D 1/02 |
| | | | 415/2.1 |
| 2012/0001438 | A1 | 1/2012 | Matsuo et al. |
| 2013/0115099 | A1* | 5/2013 | Valero Lafuente ..... F03D 80/00 |
| | | | 416/244 R |
| 2019/0136626 | A1 | 5/2019 | Manikas et al. |
| 2019/0278642 | A1* | 9/2019 | Correia ................. G06F 11/263 |
| 2021/0033075 | A1* | 2/2021 | Herrig ..................... F03D 80/00 |

FOREIGN PATENT DOCUMENTS

| EP | 2 412 970 A1 | 2/2012 | |
| WO | WO-2014037080 A1 * | 3/2014 | ............ F03D 80/80 |
| WO | WO 2017/108059 A1 | 6/2017 | |

OTHER PUBLICATIONS

EPO Search Report, dated Jan. 31, 2020.

* cited by examiner

*Primary Examiner* — Christopher R Legendre
(74) *Attorney, Agent, or Firm* — Dority & Manning, P.A.

(57) ABSTRACT

A nacelle assembly for a wind turbine is connected to a wind turbine tower through a yaw system and includes a front region coupled to a rotor having a rotor hub and at least one rotor blade. The nacelle assembly includes a nacelle having a cover structure to house wind turbine components and an add-on wind flow deflector system that is coupled to an outside of the cover structure. The wind flow deflector system guides wind flowing to the nacelle for reducing a drag of the nacelle when a wind direction is misaligned with respect to the longitudinal wind direction in a yaw system failure event.

10 Claims, 9 Drawing Sheets

NACELLE ASSEMBLY FOR A WIND TURBINE

The present disclosure relates to nacelle assemblies for wind turbines having a nacelle and a wind flow deflector system and wind turbines comprising such nacelle assemblies.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to an electrical generator, either directly ("directly driven") or through the use of a gearbox. This way, the electrical generator produces electricity which can be supplied to the electrical grid.

Most wind turbines comprise a yaw system used for orienting the rotor of the wind turbine in the prevailing wind direction. Normally, when the rotor is aligned with the wind direction, the yaw system maintains the position by means of brakes (e.g. hydraulic brake calipers and/or electro-brakes of the yaw motors). When the rotor is misaligned from the wind direction, the yaw system rotates the nacelle to reach an appropriate alignment with the wind. The nacelle can thus be rotated around the tower's longitudinal axis in or out of the wind direction. The rotatable connection between the wind turbine tower and the nacelle is called a yaw bearing.

The nacelle may house a generator and/or a converter and several electrical components controlling the operation of the generator. For example, in direct drive wind turbines the electrical generator may be positioned within the nacelle or forming part of the nacelle. In examples of wind turbines having a gearbox, the nacelle may house an electrical generator and the drive train including a gearbox.

The length of wind turbine blades and the height of wind turbines are continuously increasing with the aim of capturing as much kinetic energy as possible from the wind and, thereby, generating more electrical energy. This may consequently require increasing the size of wind turbine components within the nacelle, e.g. an electrical generator, a converter, a transformer or a gearbox. Larger nacelles to house these larger wind turbine components may thus be required. Nacelles are normally transported by truck, railway or boat from the manufacturing facility to the erection site to be lifted on top of a wind turbine tower. Depending on the shape and the size of the nacelle, transporting the nacelle from the manufacturing factory to the wind turbine farm may be difficult.

Larger nacelles may also increase the area of the nacelle facing the wind. In some events, e.g. in high wind speeds or in storm events, power cannot be supplied to the yaw system and, consequently, the nacelle cannot be aligned with respect to the predominant wind direction. During these events, wind direction may vary causing a misalignment of the nacelle with respect to the predominant wind direction. When the nacelle is misaligned, a lateral side of the nacelle may be subjected to wind flow. The lateral side may thus offer a drag or an aerodynamic resistance with respect to the wind flow. Wind flow acting on the lateral side of the nacelle may cause high bending loads on the wind turbine tower, in particular in high wind turbine towers. Towers and tower connections with the foundations may have to be designed to withstand a misaligned nacelle subjected to high wind speeds. Otherwise, the maximum wind speed able to be withstood by the wind turbine may have to be reduced.

Substantially oval nacelles may be used to reduce the aerodynamic resistance or the drag coefficient of the nacelle. This oval shape may reduce loads on the wind turbine. However, due to this specific shape, these types of nacelles are generally difficult to be manufactured and transported and a rounded or oval shape does not allow for an efficient use of the space inside the nacelle housing different components.

The present disclosure provides examples of systems and methods that at least partially resolve some of the aforementioned disadvantages.

SUMMARY

In one aspect, a nacelle assembly for a wind turbine is provided. The nacelle assembly is connected to a wind turbine tower through a yaw system and has a front region coupled to a rotor comprising a rotor hub and at least one rotor blade is provided. The nacelle assembly comprises a nacelle having a cover structure to house wind turbine components. The cover structure comprises a front side arranged at the front region; a rear side opposite to the front side; a first and a second lateral side; and a top side and a bottom side. The cover structure extends from the front side to the rear side along a longitudinal axis. The nacelle assembly further comprises an add-on wind flow deflector system coupled to an outside of the cover structure to guide wind flowing to the nacelle for reducing a drag of the nacelle when a wind direction is misaligned with respect to the longitudinal axis in a yaw system failure event.

In this disclosure, a yaw system failure event refers to an event during the operation of a wind turbine in which the yaw system cannot rotate the nacelle. This may occur when one or a plurality of yaw drives are broken so that not enough torque may be provided to rotate the nacelle. A yaw system failure event may comprise a yaw system power failure event in which there is no power or not enough power supplied to the yaw system to make the nacelle rotate to follow the predominant wind direction.

A yaw system power failure event may be caused by grid loss event or by insufficient backup power to rotate the nacelle or by broken yaw drive. During some grid loss events, blades cannot be pitched, so that loads cannot be reduced by pitching the blades. A grid loss event may be caused by an extreme storm such as hurricanes or typhoons. During an extreme storm high winds and a grid loss may occur at the same time.

In this disclosure, an add-on wind deflector system refers to an aerodynamic profile that may be coupled to a nacelle to modify the aerodynamics of the nacelle.

In this disclosure, a misalignment of the nacelle or of the longitudinal axis of the nacelle with respect to the wind direction refers that the direction of the wind speed is not substantially parallel to the longitudinal axis of the nacelle. For example, a nacelle may be misaligned with respect to the wind direction when the angle between the wind direction and the longitudinal axis of the nacelle is greater than 10°, specifically greater than 20°, and more specifically greater than 30°.

The add-on wind deflector system may modify the aerodynamic profile of the nacelle to reduce the drag of the nacelle when the wind direction is misaligned with respect to the longitudinal axis of the nacelle. The aerodynamic resistance of the nacelle may consequently be reduced. Loads acting on the wind turbine for a given wind speed when the nacelle is misaligned may thus be reduced when compared with a nacelle without an add-on wind flow deflector system. Accordingly, the tower or the connection of the tower with the foundation may be optimized or more optimally used. In addition, expensive backup power system to power the yaw system during a grid loss event may be avoided. Costs of the wind turbine may thus be reduced without adversely affecting the structural integrity of the wind turbine.

The add-on wind deflector system may be coupled to the outside of the cover structure after transporting the nacelle to the erection site. Accordingly, the add-on wind flow deflector system does not adversely affect the shape and the size of the nacelle during transport. In addition, as the add-on wind flow deflector system is coupled to the outside of the cover structure, the space inside the nacelle for housing wind turbine components may be maintained as small as possible to house the components for not increasing the overall size of the nacelle. Accordingly, a compact nacelle housing wind turbine components such as an electrical converter or an electrical generator may be provided.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
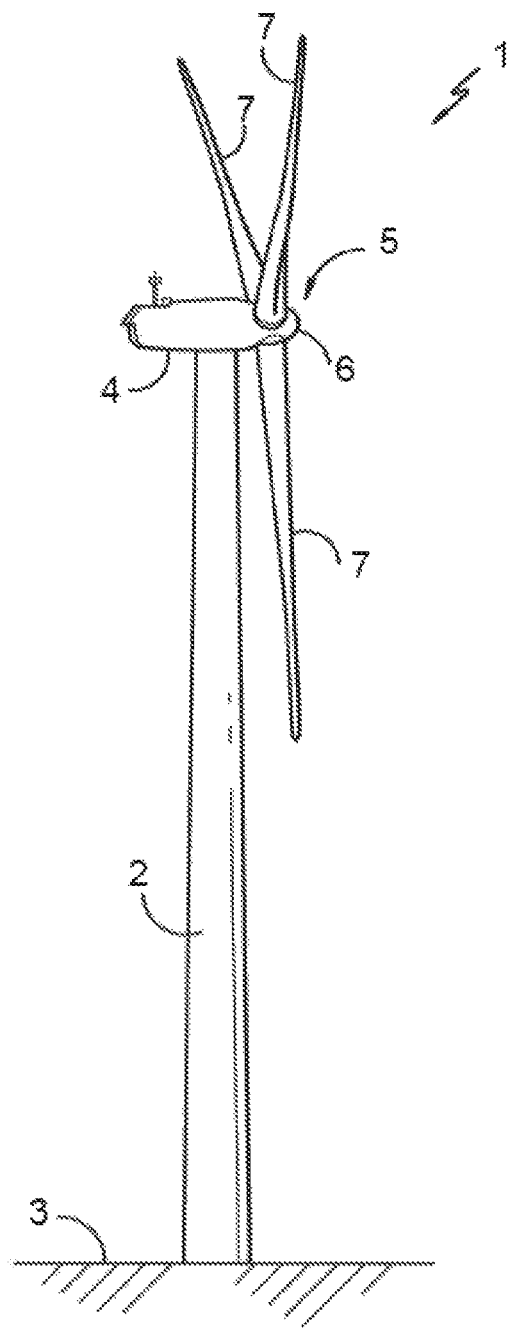
FIG. 1 illustrates a perspective view of a wind turbine according to one example of the present disclosure.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4 at a front region. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. The rotation of the rotor may be directly transmitted, e.g. in direct drive wind turbines, or through the use of a gearbox to a generator.

Figure 2:
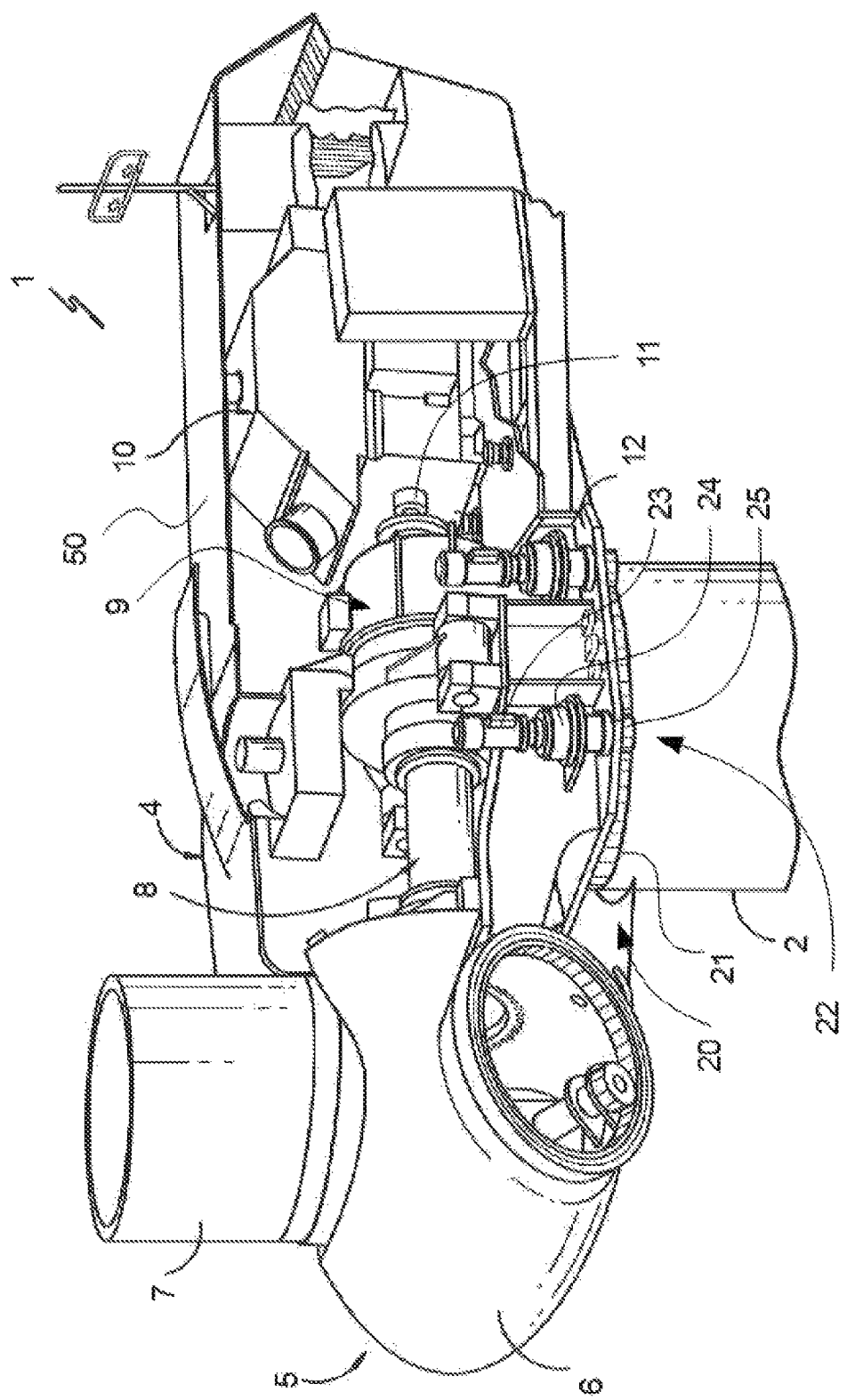
FIG. 2 illustrates a simplified, internal view of a nacelle of a wind turbine according to one example of the present disclosure.

FIG. 2 illustrates a simplified, internal view of one example of the nacelle 4 of the wind turbine 1 of the FIG. 1. As shown, the generator 10 may be disposed within the nacelle 4. In general, the generator 10 may be coupled to the rotor 5 of the wind turbine 1 for generating electrical power from the rotational energy generated by the rotor 5. For example, the rotor 5 may include a main rotor shaft 8 coupled to the hub 6 for rotation therewith. The generator 10 may then be coupled to the rotor shaft 8 such that rotation of the rotor shaft 8 drives the generator 10. For instance, in the illustrated embodiment, the generator 10 includes a generator shaft 11 rotatably coupled to the rotor shaft 8 through a gearbox 9. In alternative examples, the hub may be directly coupled to a rotor of the generator and the rotation of the hub may thus drive the rotor of the generator.

The generator 10 may be electrically coupled to the converter. The wind turbine converter may adapt the output electrical power of the generator to the requirements of the electrical grid.

It should be appreciated that the rotor shaft 8, gearbox 9, and generator 10 may generally be supported within the nacelle 4 by a bedplate or a support frame 12 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to one of the bearing components and the bedplate or support frame 12 of the nacelle 4 is coupled to the other bearing component. The yaw system 20 comprises an annular gear 21 and a plurality of yaw drives 22 with a motor 23, a gearbox 24 and a pinion 25 for meshing with the annular gear for rotating one of the bearing components with respect to the other. The motor 23 may be electrically connected to the electrical grid.

The nacelle 4 further comprises a cover structure 50 to house wind turbine components. In this example, wind turbine components housed in the cover structure 50 or enclosed by the cover structure comprise the generator 10, the converter, the gearbox 9 and the shaft 8. In other examples, wind turbine components arranged within the nacelle may refer to the converter and the generator.

Figure 3:
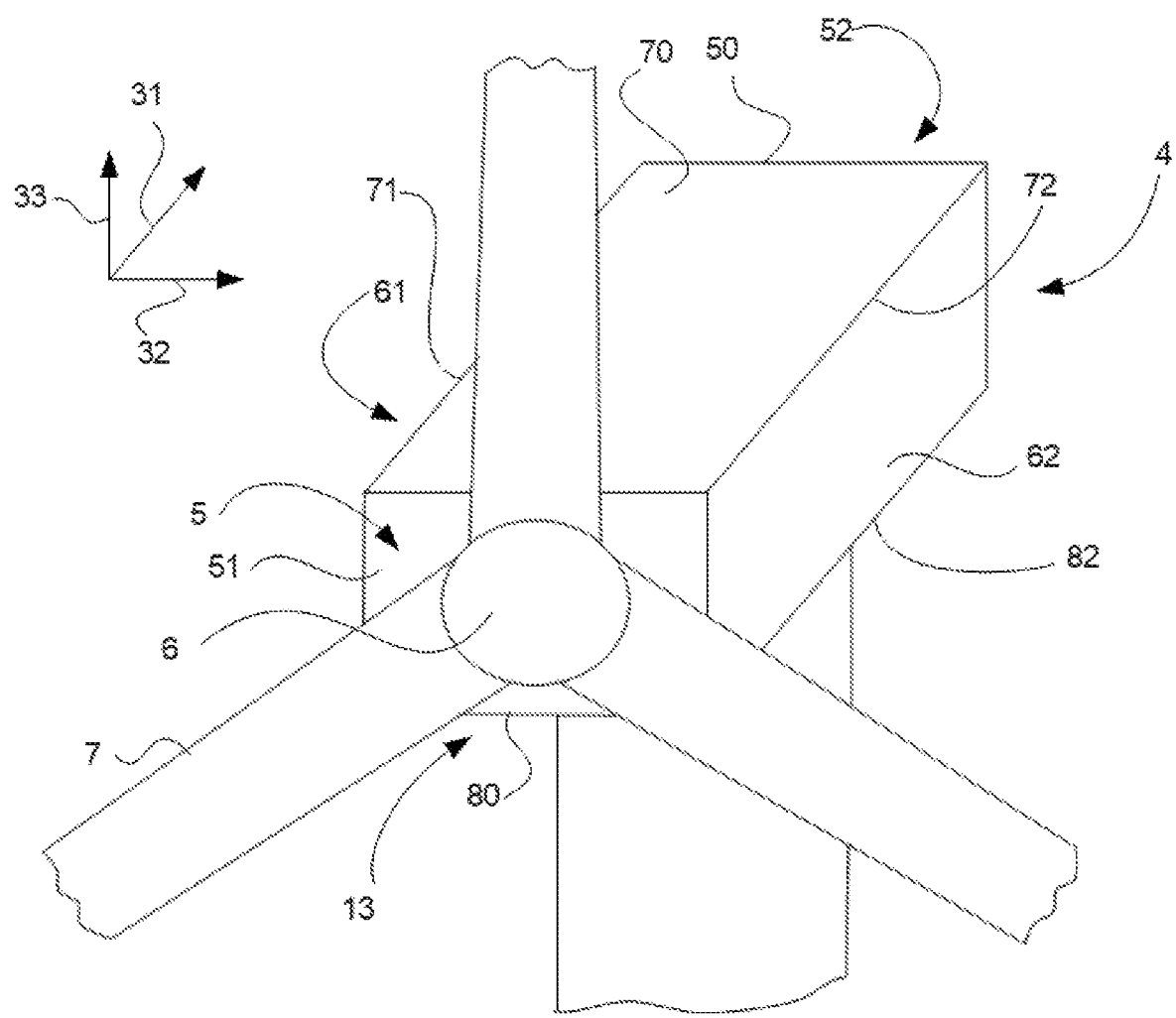
FIG. 3 schematically illustrates an isometric view of a nacelle of a wind turbine according to one example of the present disclosure.

FIG. 3 schematically illustrates a nacelle according to one example of the present disclosure. The nacelle 4 comprises a front region 13 at which a rotor 5 comprising a hub 6 and at least one rotor blade 7 is coupled. The nacelle 4 comprises a cover structure 50 comprising a front side 51 arranged at the front region 13 and a rear side 52 opposite to the front side 51. The nacelle further comprises a first 61 and a second 62 lateral side extending from the front side 51 to the rear side 52 along a direction parallel to the longitudinal axis 31, wherein the first 61 and the second 62 longitudinal sides are arranged on opposite sides of the of the cover structure.

The cover structure 50 further comprises a top side 70 extending from the front side 51 to the rear side 52 along the longitudinal a direction parallel to the axis 31 and from the first lateral side 61 to the second lateral side 62 along a direction parallel to a transverse axis 32, wherein the transverse axis 32 is perpendicular to the longitudinal axis 31. Furthermore, the cover structure of this figure comprises a bottom side 80 extending from the front side 51 to the rear side 52 along a direction parallel the longitudinal axis 31 and from the first lateral side 61 to the second lateral side 62 along a direction parallel to the transverse axis 32. The top 70 and the bottom 80 side are arranged on opposite sides of the cover structure.

The first 61 and the second lateral sides 62 may extend from the bottom side 80 to the top side 70 along a direction parallel to a yawing axis 33, wherein the yawing axis 33 is perpendicular to the longitudinal axis 32 and to the transverse axis 32.

The cover structure 50 of this figure further comprises a first 71 and a second top edge 72 respectively formed between the top side 70 and the first 61 and the second 62 lateral sides. Additionally, the cover structure may comprise a first 81 and a second bottom edge 82 (not shown in FIG. 3) respectively formed between the bottom side 80 and the first 61 and the second 62 lateral sides.

An add-on wind flow deflector system according to any of the examples herein described may be permanently coupled to an outside of the cover structure to form a nacelle assembly. For example, an add-on wind flow deflector system may at least partially cover or shield a portion of the first and second lateral sides. The add-on wind flow deflector system may thus modify the external shape of the nacelle on the lateral sides to reduce a drag of the nacelle when the longitudinal axis of the nacelle is misaligned with respect to the wind direction in a yaw system failure event. In some examples, a yaw system failure event may comprise a grid loss event. In some examples, a yaw system failure event may comprise a malfunction of the yaw system. Accordingly, the nacelle cannot be rotated by the yaw system and changes in wind direction cannot be followed by the nacelle.

As the nacelle is misaligned with respect to the wind direction, wind flows towards one of the first and of the second lateral sides.

In this disclosure, misalignment of a nacelle means that the longitudinal axis of the nacelle does not substantially correspond to the predominant wind direction. For example, a predominant wind direction may have changed but the nacelle may have not been rotated about the yawing axis to align with the wind direction, for example because of a malfunctioning of the yaw system.

A drag coefficient, commonly denoted as ca, is a dimensionless quantity that is used to quantify the drag or resistance of an object, e.g. a nacelle, in a fluid environment, such as air or wind. A low drag coefficient indicates that the object has a better aerodynamic, e.g. offers less resistance to the wind flowing around the object. The drag coefficient is generally defined as:

$$c_d = \frac{2 \times F_d}{\rho \times A \times w^2}$$

where:
$c_d$ is the drag coefficient;
$F_d$ is the drag force, which is the force component in the direction of the wind;
$\rho$ is the mass density of the wind;
w is the wind speed relative to the object;
A is the reference area of the nacelle.

The drag force ($F_d$) is proportional to the drag coefficient ($c_d$). In this disclosure drag force and drag are used indistinctly. Accordingly, when the drag coefficient is reduced the drag force is also reduced. A drag force acting on a nacelle generates a bending moment about the base of the tower. Reducing the drag force may thus reduce loads on the base of the tower. The drag force may be reduced by reducing the drag coefficient and the drag coefficient depends on the shape of the object. Accordingly, the shape of the part of the nacelle facing the wind, e.g. a lateral side, may be modified by the add-on wind flow deflector system to reduce the drag coefficient of the nacelle, and consequently, the drag force.

In the example of the FIG. 3, the cover structure of the nacelle has a substantially cuboid or rectangular box shape. In some examples, edges formed between the sides of the cover structure may be rounded. A cuboid shape may facilitate the transportation and the storage of the nacelle. In some examples, the cover structure may have a standard container shape. Furthermore, a cuboid shape may maximize the use of the internal space inside the nacelle to house wind turbine components. After transporting the nacelle to the wind turbine site, an add-on wind flow deflector system may be permanently coupled to an outside of the cover structure or unfolded. Thereby, transport of the nacelle is not adversely affected by the shape of the add-on wind flow deflector system.

In some examples, the add-on wind flow deflector system may be moved from a resting position to a deployed position. The wind turbine may operate with one or more wind flow deflector devices of the add-on wind flow deflector system in the resting position, i.e. the add-on wind flow deflector system cannot substantially modify the aerodynamic profile of the nacelle. The add-on wind flow deflector system may be moved to a deployed position when a yaw system failure event is detected. An actuator may move one or more wind flow deflector devices of the add-on wind flow deflector system from a resting position to a deployed position. In a deployed position, the add-on wind flow deflector system reduces the drag of the nacelle when a wind direction is misaligned with respect to the longitudinal axis of the nacelle.

Figure 4:
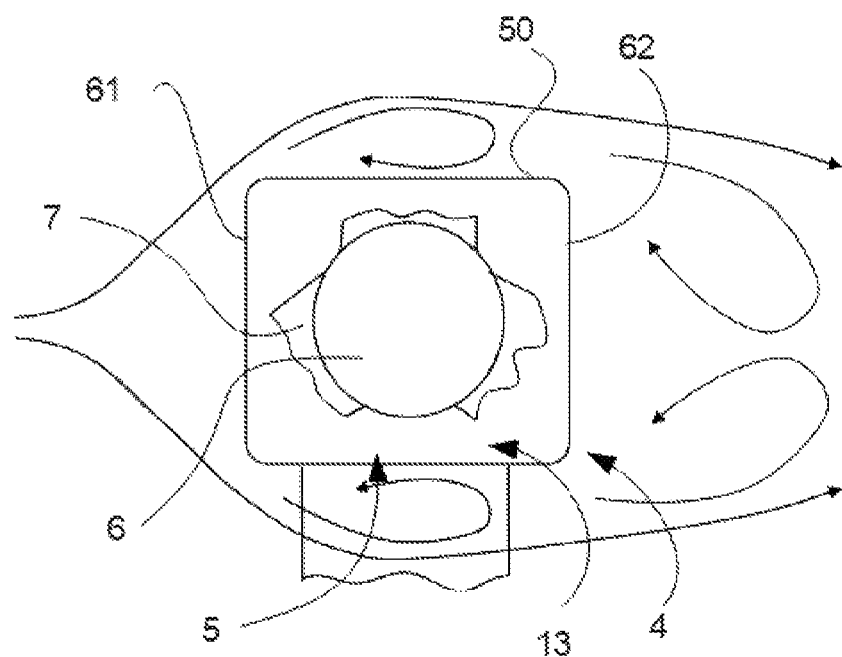
FIGS. 4 and 5 respectively show a frontal view of a prior art nacelle and a nacelle assembly according to one example of the present invention experiencing a wind flow from a lateral side of a cover structure of a nacelle.
Figure 5:
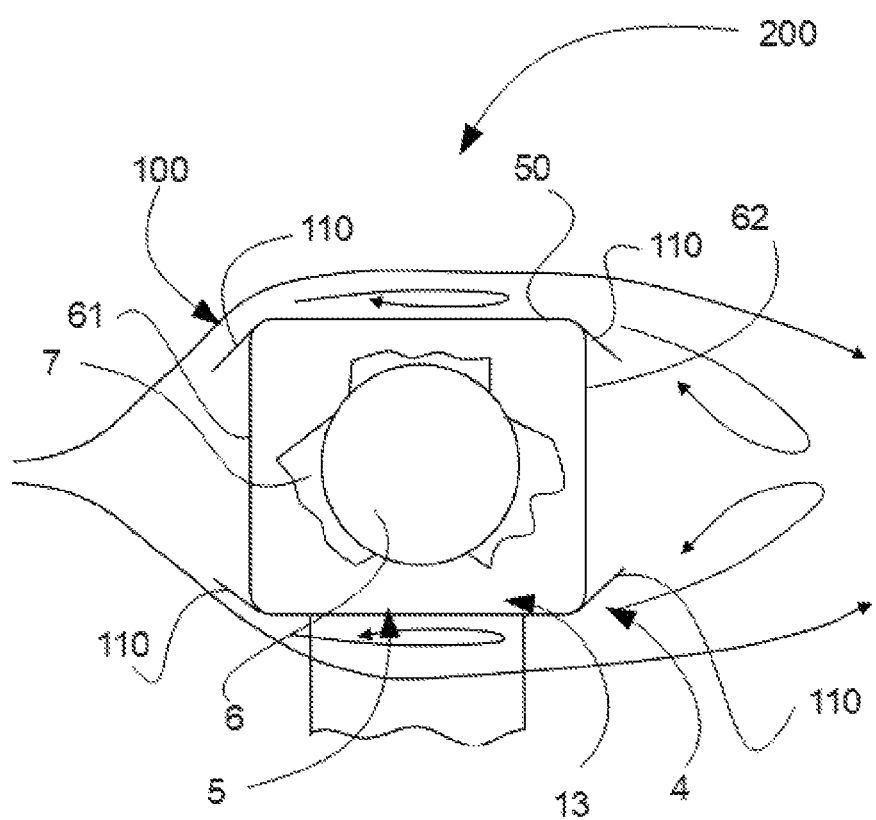

FIGS. 4 and 5 respectively show a frontal view of a nacelle without and with an add-on wind flow deflector system experiencing a wind flow from a lateral side of a cover structure of a wind turbine. A rotor 5 having a hub 6 and three blades 7 is rotatably coupled to a front region 13 of a nacelle 4. The nacelle 4 of the example in these figures comprises a cover structure 50 having a first lateral side 61 and a second lateral side 62. However, in FIG. 5 an add-on wind flow deflector system 100 is coupled to an outside of the cover structure 50 to form a nacelle assembly 200.

In these figures, wind is flowing towards the first lateral side 61. Wind direction is misaligned with respect to the longitudinal axis of the nacelle. In FIG. 4 (without an add-on wind flow deflector system) wind flow becomes separated at the first top edge causing wind wakes to widen. As wakes are widened, wind pressure on the second lateral side 62 drops and the drag increase. Thereby, a drag force acting on the first lateral side 61 also increases and loads on the base of the tower are consequently increased.

However, in FIG. 5 the add-on wind flow deflector system 100 having a wind flow coupled to the cover structure 50 guides the wind flowing to the nacelle. The add-on wind flow deflector system may reduce the separation of the wind flow around the top and the bottom side of the cover structure. Wake formation on the second lateral side 62 may thus be reduced or narrowed. Narrowing wakes on the second lateral side may cause a reduction of the drag force acting on the first lateral side 61 when compared to the nacelle of FIG. 4.

The add-on wind flow deflector system 100 of the nacelle assembly 200 of FIG. 5 comprises a plurality of wind flow deflector devices 110. In particular, the add-on wind flow deflector system 100 comprises four wind flow deflector devices 110. In other examples, the add-on wind flow deflector system may comprise two wind flow deflector devices. For example, one wind flow deflector device may extend along the first lateral side and another wind flow deflector device may extend along the second lateral side.

In some examples, one or more wind flow deflector devices of the plurality of wind flow deflector devices may cover a portion of a first top edge portion formed between the top side and the first lateral side and/or a portion of a second top edge region formed between the top side and the second lateral side. In the example of FIG. 5, each of the wind flow deflector devices covers or shields a portion of one of the edges formed between the top and the lateral sides and between the bottom and the lateral sides.

Alternatively, or additionally, one or more wind flow deflector devices of the plurality of wind flow deflector devices may cover or shield a portion of the first lateral side and/or the second lateral side. In the example of FIG. 5, the wind flow deflector devices cover a portion of the edges formed between the lateral sides and the top portion and the bottom portion and further cover a portion of the first and the second lateral sides. In some examples, some wind flow deflector devices may cover a portion of an edge and some wind flow deflector devices may cover a portion of a lateral side.

In some examples, one or more wind flow deflector devices of the plurality of wind flow deflector devices may cover a portion of the top side. For example, one wind flow deflector device may extend from the first lateral side to the second lateral side. This one wind flow deflector device may be coupled to the top side of the cover structure. In further examples, another wind flow deflector device may cover and may extend along a portion of the bottom side from the first lateral side to the second lateral side. This wind flow deflector device extending along a portion of the bottom side may be coupled to the bottom side.

In this figure, the wind flow deflector devices comprise a plate extending from a proximal end connected to the cover structure to a distal free end. In this example, the plate is substantially flat, however, in other examples, the plate may be curved. The proximal end may be for example connected to the lateral sides or to the edges. For example, a proximal end of a wind flow deflector device may be connected to the first lateral side or to the second lateral side forming an acute angle between the plate and the lateral side at which the proximal end is connected.

In further examples, a wind flow deflector device may be an elongated body extending from the front side to the rear side along a lateral side. The elongated body may have a cross-sectional triangular shape or a cross-sectional semi-elliptical shape.

In yet further examples, the wind flow deflector system may comprise a wind flow deflector device having a body and another wind flow deflector device comprising a plate.

Figure 6:
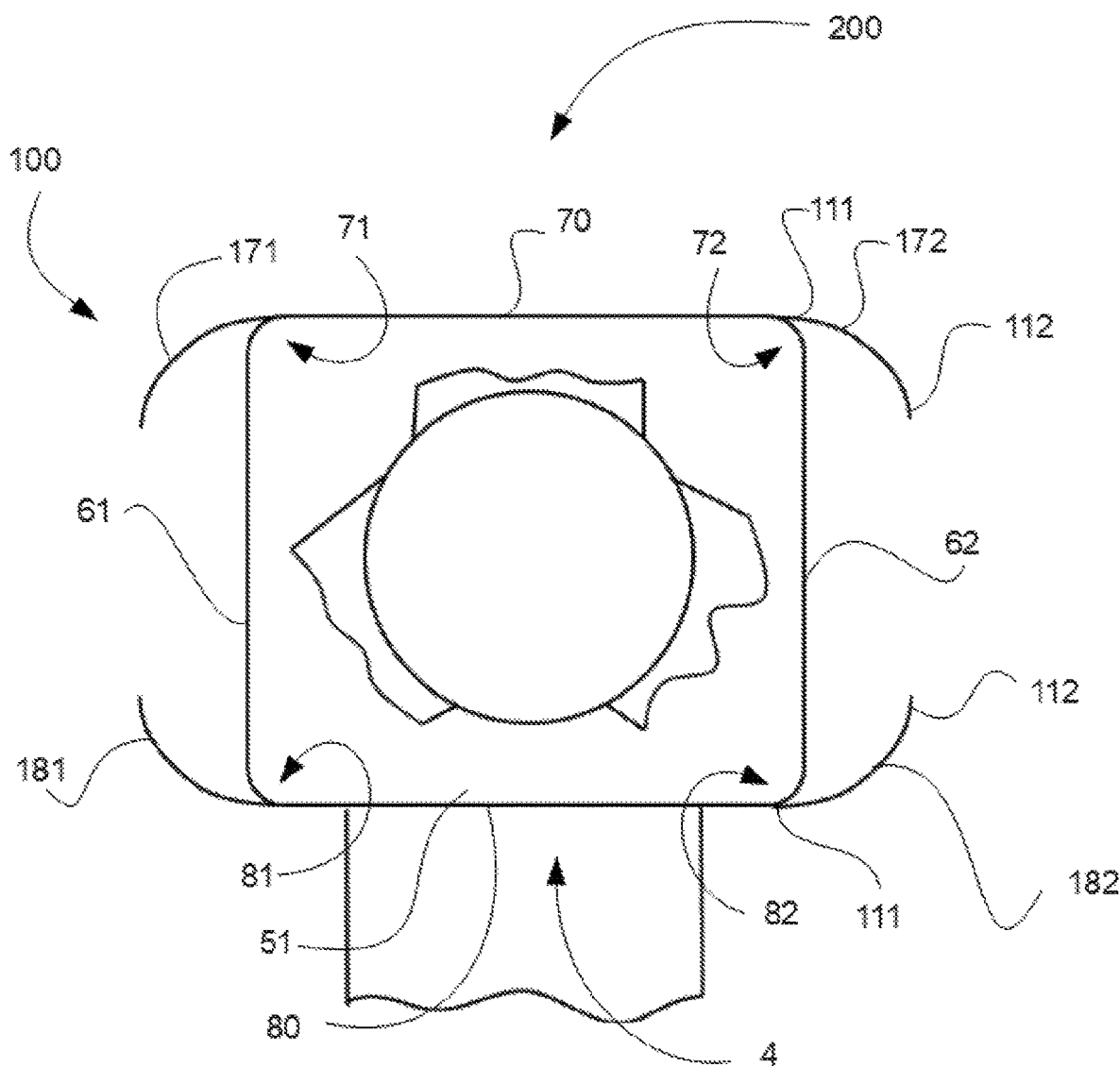
FIG. 6 schematically illustrates an example of a nacelle assembly according to one example of the present disclosure.

FIG. 6 schematically illustrates an example of a nacelle assembly according to one example of the present disclosure. The nacelle assembly 200 has a front region at which a wind turbine rotor is coupled and comprises a nacelle 4 and an add-on wind flow deflector system 100.

The nacelle of FIG. 6 has a cover structure to house wind turbine components, e.g. an electrical converter or gearbox or a generator. The cover structure has a substantially cuboid shape and comprises a front side 51 arranged at the front region and a rear side opposite to the front side (not shown in this figure). The cover structure further comprises a first 61 and a second lateral side 62 extending from the front side 51 to the rear side along a direction parallel to the longitudinal axis, wherein the first and the second lateral sides are arranged on opposite sides of the cover structure. In addition, the cover structure of FIG. 6 comprises a top 70 and a bottom side 80 extending from the front side 51 to the rear side along a direction parallel to the longitudinal axis and from the first 61 to the second lateral sides 62 along a direction parallel to a transverse axis, wherein the transverse axis is perpendicular to the longitudinal axis.

In FIG. 6, the cover structure further comprises a first 71 and a second top edge 72 respectively formed between the top side 70 and the first 61 and the second lateral sides 62; and a first 81 and a second bottom edge 82 respectively formed between the bottom side 80 and the first 61 and the second lateral sides 62.

The add-on wind flow deflector system 100 of this figure comprises wind flow deflector devices extending along the longitudinal axis (perpendicular to the paper). In this example, the wind flow deflector devices are coupled to an outside of the cover structure to at least partially cover a portion of the first 61 and the second lateral sides 62. Accordingly, the drag may be reduced when one of the lateral sides is experiencing a wind flow.

In FIG. 6, the wind flow deflector devices comprise a plate extending from a proximal end 111 coupled to the cover structure to a distal free end 112 (for clarity purposes only indicated in the wind flow deflector devices associated with the second lateral side 62).

The add-on wind flow deflector system 100 of this figure comprises a first top wind flow deflector device 171 having the proximal end 111 coupled to the first top edge portion 71, a second top wind flow deflector device 172 having the proximal end 111 coupled to the second top edge 72, a first bottom wind flow deflector device 181 having the proximal end 111 coupled to the first bottom edge 81; and a second bottom wind flow deflector device 182 having the proximal end 111 coupled to the second bottom edge 82.

In FIG. 6, the wind flow deflector devices 171 and 181 form an acute angle with the first lateral side 61 and the wind flow deflector devices 172 and 182 form an acute angle with the second lateral side 62.

In this figure, the wind flow deflector devices are curved. Reduction of the drag force may thus be increased. Curved wind flow deflector devices may also allow increasing the range of upflow angles, i.e. the angles of attack of wind coming from downside, so that the drag force may additionally be reduced for some wind directions when compared with nacelles without an add-on wind flow deflector system. In this example, the distal free ends 112 of the wind flow deflector devices covering one lateral side are facing to each other and the proximal ends are tangential to a portion of the edges.

In other examples, the nacelle assembly may comprise wind flow deflector devices coupled to the first and to the lateral sides through the proximal end of the plate. In some examples, these plates may form an acute angle between the plate and the lateral side at which the proximal end is coupled.

In further examples, a proximal end of one wind flow deflector device may be coupled to the top side or to the bottom side.

Figure 7:
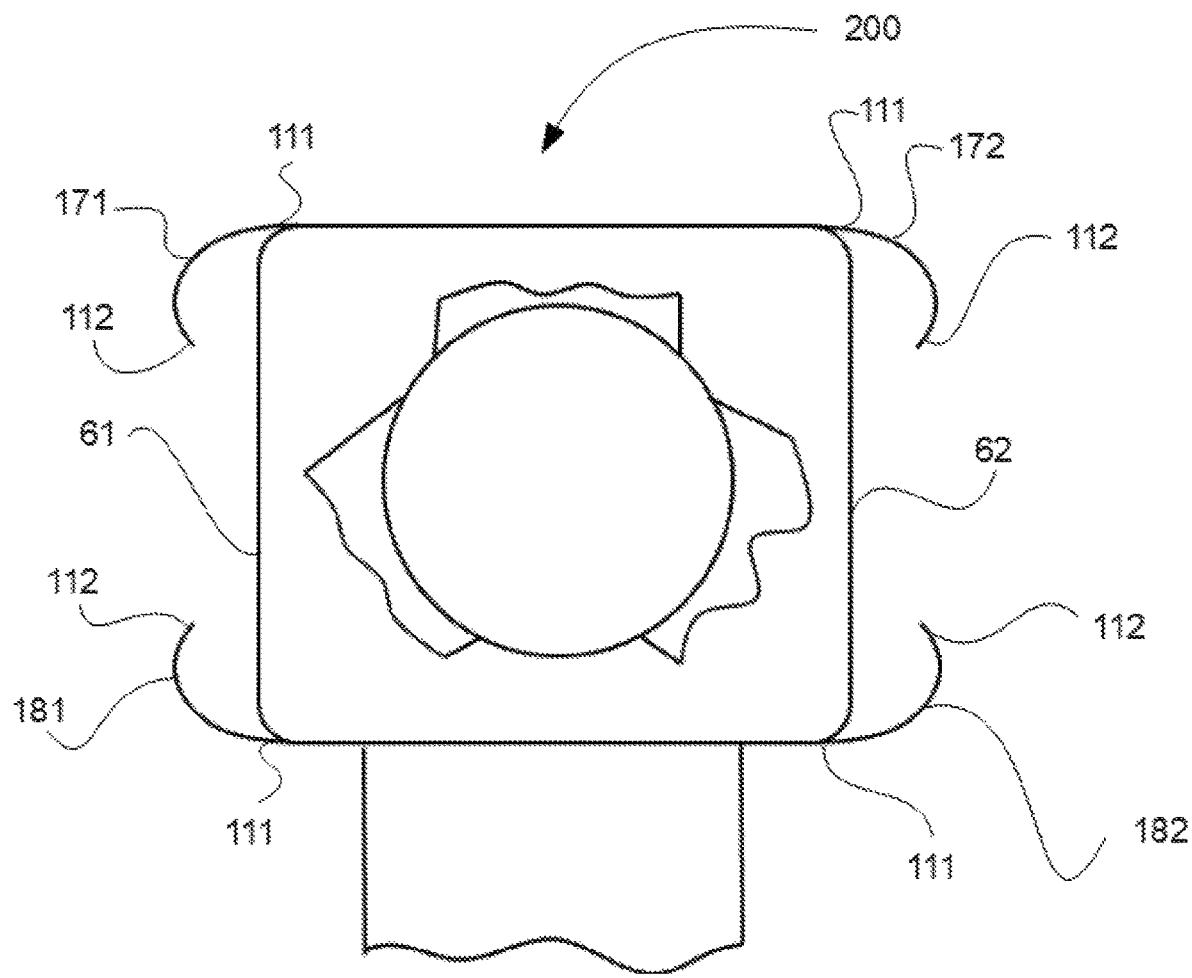
FIG. 7 schematically illustrates an example of a nacelle assembly according to one example of the present disclosure.

Similar to the nacelle assembly depicted in FIG. 6, FIG. 7 schematically illustrates another example of a nacelle assembly according to one example of the present disclosure. However, in FIG. 7 the distal free ends 112 of the wind flow deflector devices face the lateral sides. The distal free ends 112 of the wind flow deflector devices 172 and 182 face the second lateral side 62 and the distal free end 112 of the wind flow deflector devices 171 face the first lateral side 61. The wind flow deflector devices extend outwardly from the proximal ends and inwardly at the distal free ends, so that the distal free ends are pointing towards or facing the lateral sides.

FIGS. 8-11 show several examples of wind flow deflector devices according to the present disclosure.

Figure 8:
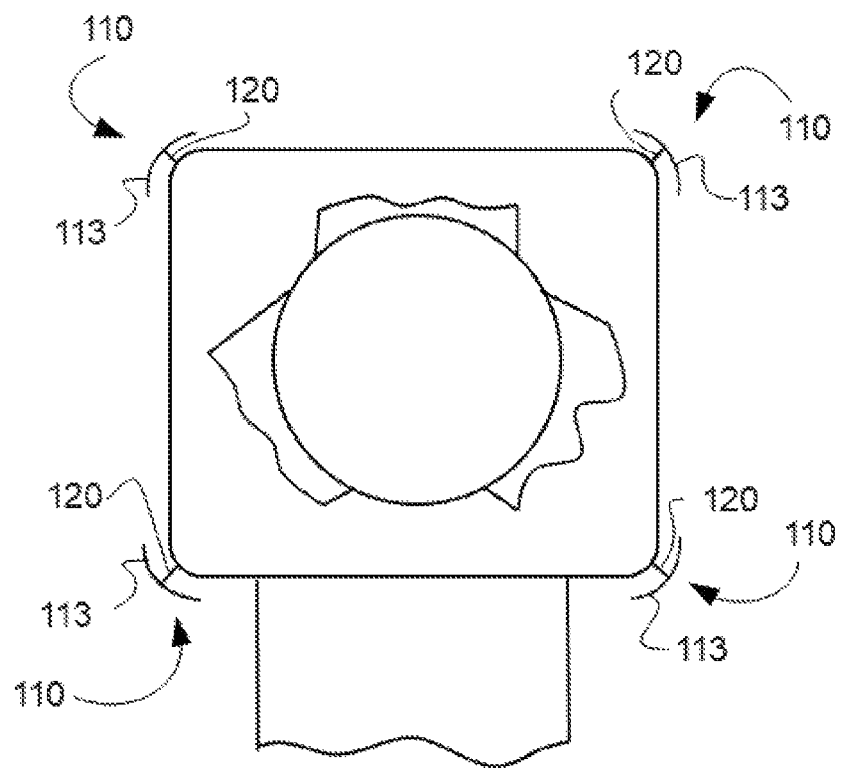
FIGS. 8-11 show several examples of wind flow deflector devices according to the present disclosure.
Figure 9:
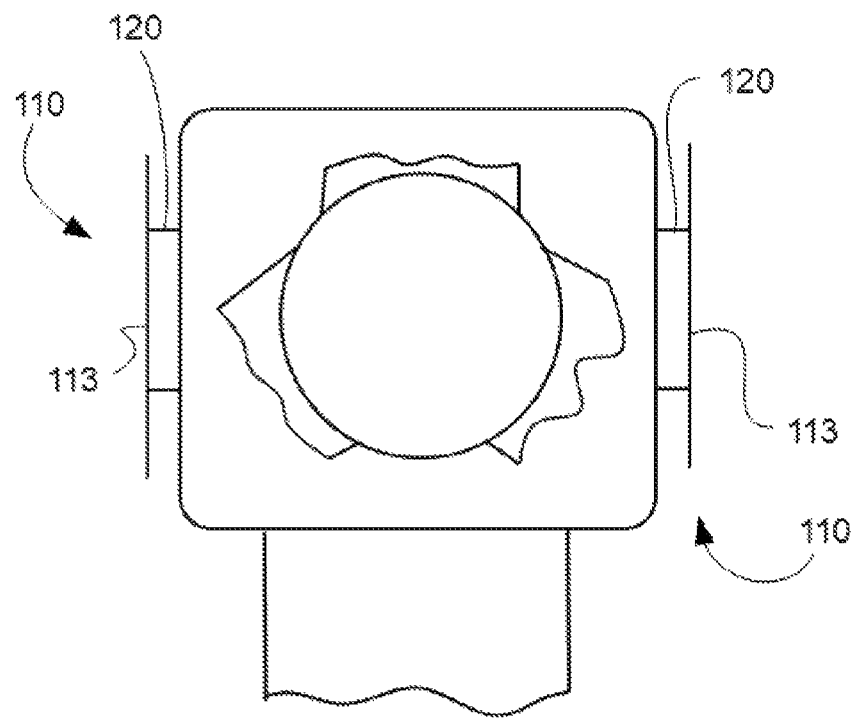

The wind flow deflector devices 110 of FIGS. 8 and 9 comprise a plate 113 and a supporting structure 120 connecting the plate to the cover structure. In FIG. 8, the plates 113 are curved and are substantially covering the edges formed between the top and the lateral sides and the bottom and the lateral sides. The plates 113 of FIG. 9 are substantially flat and shield a portion of the lateral sides. The plate 113 arranged on the first lateral side may guide the wind flow towards the top and the bottom side more upstream than the first lateral side of the cover structure. The plate 113 arranged on the second lateral side may capture wake vortices. In these figures, the supporting structure 120 may be connected to the edges and/or to the lateral sides. In other examples, the supporting structure may be coupled to the top and to the bottom side of the cover structure. The plates of these examples may guide wind flowing from one lateral side to the other lateral side to provide a smoother transition from the lateral side to the top and bottom sides for reducing the drag than in a nacelle without an add-on wind flow deflector system.

Figure 10:
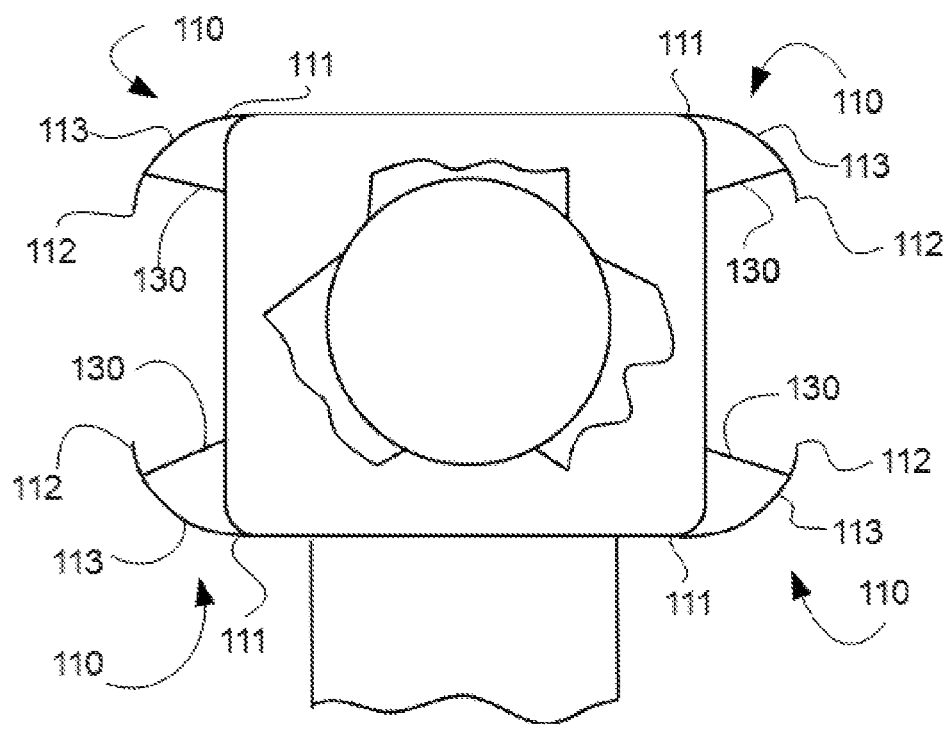

The wind flow deflector devices 110 of FIG. 10 are similar to those illustrated in FIG. 6. However, the wind deflector devices of the FIG. 10 comprise a reinforcing structure. The reinforcing structure may maintain a predetermined shape of the wind flow deflector device subjected at high wind speeds. The reinforcing structure may thus prevent an excessive deflection of the wind deflector device. In FIG. 10, the reinforcing structure comprises a strut 130 connecting the lateral side and the plate 113. In some examples, the length of the strut may be variable to modify the aerodynamic shape of the wind deflector device, e.g. the strut may be a telescopic bar. Additionally, or alternatively, the reinforcing structure may comprise a rib extending from the proximal end 111 to the distal free end 112.

Other examples of wind flow deflector devices according to the present disclosure may also comprise a reinforcing structure.

Figure 11:
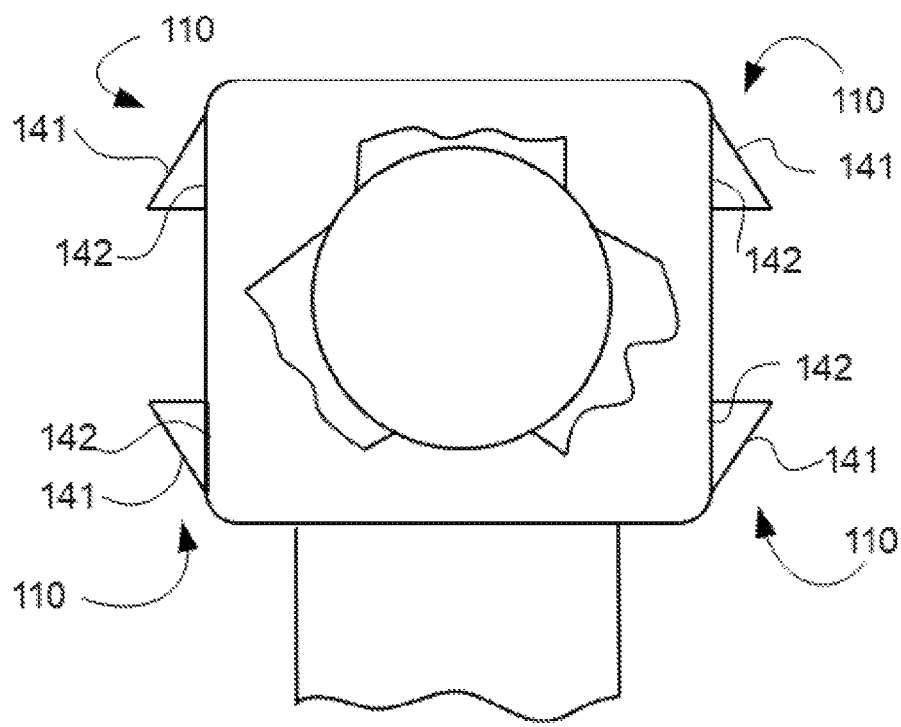

Instead of wind flow deflector devices having a plate, the wind flow deflector devices of FIG. 11 comprise a body having a guiding surface 141 to guide wind flow and a coupling surface 142 to connect the body to the cover structure of the nacelle. In this example, the body has a substantially cross-sectional triangular shape, however, in other examples, the body may have a substantially cross-sectional semi-elliptical shape. In these examples, the guiding surface may thus be curved. In some examples, the coupling surface may engage with a portion of a lateral side. In some examples, the coupling surface may engage with a portion of the top or bottom sides or with a portion of the edges.

Wind flow deflector devices according to any of the examples herein described may be made from a flexible material. The shape of the wind flow deflector device may thus be adapted to the pressure exerted by the wind onto the wind flow deflector device. The stiffness of the material and the device may be chosen such that it deforms in a desired manner with increasing wind pressure. In some examples, a wind flow deflector device may be made from aluminum, composites or rubber. In some examples, a wind flow deflector device may be inflatable.

An add-on wind flow deflector system according to any of the examples herein disclosed may be coupled to an outside of the cover structure by gluing or fastening or a combination of thereof. For example, a proximal end of a wind flow deflector device may be screwed to the cover structure. In further examples, wind flow devices may be coupled to the cover structure by magnetic forces. In other examples, a body-shaped wind flow deflector device may comprise a coupling surface glued to a portion of the cover structure. Wind flow deflector devices may thus be easily coupled to the cover structure in an erection site, e.g. before lifting the nacelle or even after connecting the nacelle to the tower.

In some examples, a wind flow deflector system may be hingedly connected to the cover structure. For example, a proximal end of a plate may be connected through a hinge to a lateral side or to an edge of the cover structure. The angle of the plate with respect to the lateral sides may thus be modified. The shape of the plate may be adapted to the expected wind speed on a specific site. The drag coefficient of the wind flow deflector device may thus be modified depending on the circumstances to reduce the drag.

In some examples, the plate may be moved from a resting position to a deployed position. The plate may be in a resting position when the plate is not substantially modifying the aerodynamic resistance of the nacelle, e.g. when the plate is substantially parallel to the lateral sides. The plate may be in a resting position when the nacelle is not subjected to high speed winds and therefore the nacelle is aligned to the wind direction. The plate may be in a deployed position when the plate is substantially modifying the aerodynamic resistance of the nacelle when the wind direction is misaligned with respect to the longitudinal axis of the nacelle and yaw system failure event occurs. Accordingly, the drag may be modified, i.e. deployed, when wind speed experiencing the nacelle when misaligned is higher than a predetermined value. Consequently, the aerodynamics of the nacelle when the wind turbine is normally operating may not be adversely affected.

In some examples, the plate may be passively moved from a resting position to a deployed position. In these examples, wind applied onto the wind flow deflector device may modify its shape or cause the deployment to reduce the resistance offered against the wind. This may help to reduce loads acting on the wind turbine in for example grid loss events when electrical supply to components inside the nacelle may be (temporarily) lost.

In some examples, a wind flow deflector device may comprise an actuator to move the plate from the resting position to the deployed position.

In some examples, the actuator may comprise an electromagnet to retain the plate in the resting position and to allow the plate to move to the deployed position when the current is turned off. Accordingly, the plate may be deployed when the electromagnet is not powered. The plate may thus be (automatically) deployed in a grid loss event.

In further examples, the actuator may comprise a telescopic bar extending from a resting to a deployed position. The angle between a wind flow deflector device and a lateral side may thus be controlled. Accordingly, the drag coefficient may be adjusted depending on for example wind speed.

In some examples, the actuator may be powered by a power storage system. The power storage system may comprise a battery and/or or a capacitor. A battery stores its potential energy in a chemical form and the potential energy in a capacitor is stored in an electrical filed. The capacitor may be an ultracapacitor. An ultracapacitor may also be known as a supercapacitor or a double-layer capacitor. An ultracapacitor generally differs from an ordinary capacitor in that it has much higher capacity and energy density, while at the same time having a higher power density.

In some examples, the power storage system to activate the actuator for moving the wind flow deflector device may be a dedicated power storage system. In some examples, the actuator may use power stored in power storage systems acting as a backup source of energy for other wind turbine components. For example, a backup power system for temporary powering a pitch system may be used to activate the actuator. The backup power system may comprise a battery and/or ultracapacitors for powering the pitch system. Power required to activate the actuator is lower than power required to rotate the nacelle with the yaw system.

In this disclosure, a length of the nacelle and a length of a wind flow deflector device extend substantially parallel to the longitudinal axis of the nacelle. In some examples, one or more wind flow deflector devices may have a length substantially similar to the length of the nacelle, i.e. the one or more wind flow deflector completely extend from the front side to the rear side of the cover structure. For example, one or more wind flow deflector devices may have a length of 6 meters (236.22 inches) for a nacelle having a length of 6 meters (236.22 inches). In some examples, one or more wind flow deflector devices may a have a length between 4 meters (157.48 inches) and 10 meters (393.70 inches).

In other examples, one or more wind flow deflector devices may have a length between 25% and 75% of the length of the cover structure. For example, one or more wind flow deflector devices may have a length between 1 meter (39.37 inches) and 7.5 meters (295.28 inches).

In some examples, several wind flow deflector devices may be arranged in a single row parallel the longitudinal axis. For example, two wind flow deflectors may be arranged in a single row. The length of these two wind flow deflectors may be for example between 25% and 50% of the total length of the cover structure.

In those examples wherein several wind flow deflector devices are arranged in a single row parallel to the longitudinal axis, the wind flow deflector devices may be spaced or continuously arranged. For example, several wind flow deflector devices may be arranged adjacent to each other, i.e. one edge of one wind flow deflector device may contact one edge of the adjacent wind flow deflector device. Alternatively, a space may be arranged between two neighboring wind flow deflector devices.

In this disclosure, a height of a cover structure means the distance between the top and the bottom side of the cover structure. A width of a wind flow deflector device is a distance between a proximal end and a distal free end. In some examples, the width of one or more wind flow deflector devices may be between 15% and 70% of the height of the cover structure. For example, the width of one or more wind flow deflector device may be between 0.50 (19.68 inches) meters and 4 meters (157.48 inches).

In some examples, the width may be variable along the lateral sides of the cover structure. For example, edges of the wind flow deflector device close to the rear and/or to the front side of the cove structure may have a width shorter than a width in a central portion of the wind flow deflector device. The wind flow deflector device may thus have a substantially rounded shape with a longer width in a central portion and a shorter width in portions close to the rear and the front side of the cover structure.

In a further aspect, a wind turbine comprising a nacelle assembly according to any of the examples herein disclosed is provided. The wind turbine comprises a tower, on which the nacelle is mounted, a yaw system rotatably connecting the nacelle assembly to the tower and a rotor including a rotor hub and at least one rotor blade, the rotor being arranged at the front side of the nacelle assembly.

Figure 12:
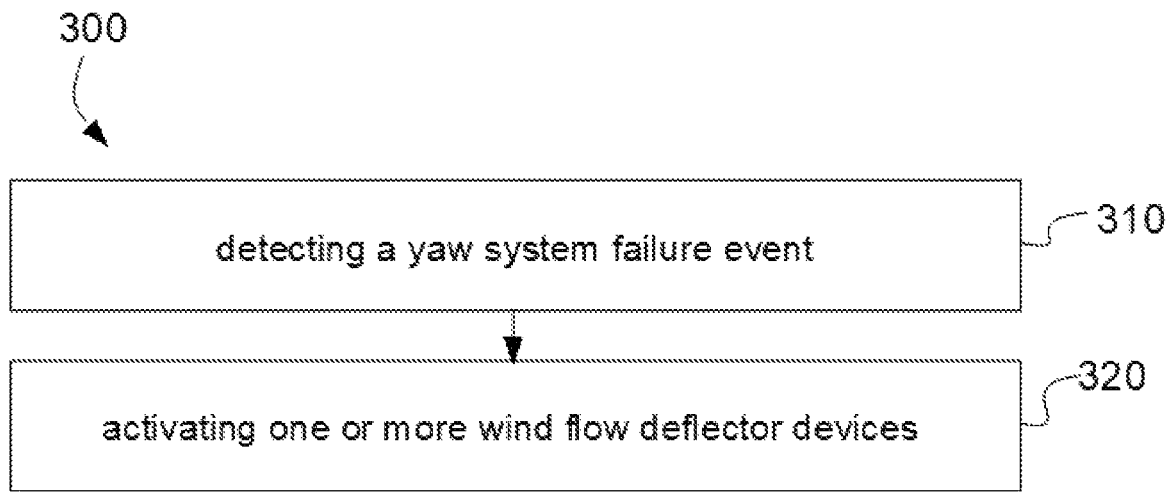
FIG. 12 shows a flow diagram of an example of a method for reducing loads during a yaw system failure event in a wind turbine according to one example of the present disclosure.

FIG. 12 shows a flow diagram of an example according to the present disclosure of a method for reducing loads during a yaw system failure event. A yaw system failure event may comprise a failure in one or in several yaw drives and/or a grid loss. The wind turbine may comprise a nacelle assembly having an add-on wind flow deflector system configured to be moved from a resting position to a deployed position according to any of the examples herein described.

At block 310, detecting a yaw system failure event is represented. In those examples wherein the yaw system failure is a yaw drive failure, the yaw system failure event may be detected by a sensor coupled to a wind turbine controller. In those examples, wherein the yaw system failure is a yaw system power failure event, i.e. an event in which there is no power or not enough power supplied to the yaw system to make the nacelle rotate to follow the predominant wind direction, the yaw system failure event may be directly detected as no power is supplied to the yaw system.

In some examples, the method may include obtaining a wind direction and/or a wind speed. Obtaining a wind speed may comprise determining the wind speed from at least one of a pitch angle, an electrical power output, a rotational speed of the wind turbine rotor. A wind turbine controller may use these operational parameters to determine the wind speed. Alternatively, or additionally, wind speed may be directly measured by a wind sensor or by differential pressure sensors arranged on the nacelle. In grid loss events, these sensors may be self-powered and a backup power system may be used to power the wind turbine controller to determine the wind speed.

Obtaining a wind direction may comprise determining the wind direction by obtaining loads from the blades sensors and using the wind turbine controller to determine the wind direction. In some examples, the wind direction may be directly measured by a wind sensor. In grid loss events the sensors may be self-powered and a backup power system may be used to power the wind turbine controller.

For example, an anemometer may provide the wind direction and the wind speed at the wind turbine.

Activating one or more wind flow deflector devices coupled to an outside of a cover structure of the nacelle assembly by moving the wind flow deflector devices to a deployed position when a yaw system failure event is detected is represented at block 320.

In some examples, moving the wind flow deflector device to a deployed position may also take into account the wind speed and the wind direction. In this way, the wind flow deflector device may be moved to a deployed position when a wind speed higher than a predetermined wind speed is determined and when the wind direction is misaligned with respect to the longitudinal axis and when a yaw system failure event is determined. Accordingly, the wind flow deflector device is not deployed when the nacelle is not misaligned or at low wind speeds.

Alternatively, or additionally, the method may comprise determining a duration of the yaw system failure event. Moving the wind flow deflector devices to a deployed position may take into account the duration of the yaw system failure event. For example, the wind flow deflector devices may be moved to a deployed position only when the duration of the yaw system failure event is longer than a predetermined duration. According to this aspect, short yaw system failure events do not deploy the wind flow deflector devices. This may be the case in e.g. short grid loss events.

During a yaw system failure event, wind direction may change and the nacelle may thus be misaligned. As the nacelle cannot be rotated to follow the changes of the wind direction, the activated wind flow deflector devices may reduce the drag of the nacelle to reduce loads acting on the wind turbine.

Figure 13:
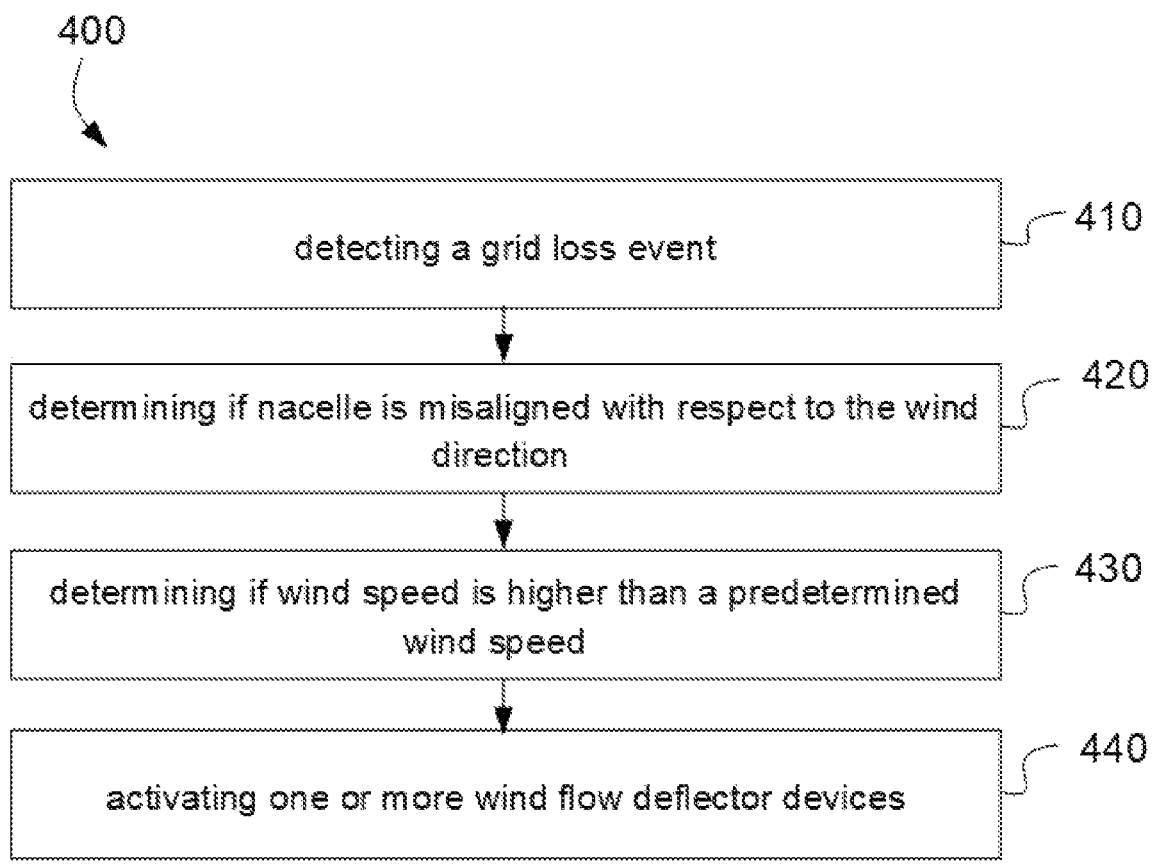
FIG. 13 shows a flow diagram of an example of a method for reducing loads during a grid loss event in a wind turbine according to one example of the present disclosure.

FIG. 13 shows a flow diagram of an example according to the present disclosure of a method for reducing loads in a wind turbine during a grid loss event. The wind turbine may comprise a nacelle assembly having one or more wind flow deflector devices configured to be moved from a resting position to a deployed position according to any of the examples herein described.

At block 410, detecting a grid loss event is represented. A grid loss event may be directly detected in e.g. the transformer, the converter or the generator as no power is supplied to them. A self-powered sensor may detect an increase of loads and a wind turbine controller having an energy storage system may determine that there is grid loss event.

At block 420, determining if the nacelle is misaligned with respect to the wind direction is represented. In some examples, this may include obtaining a wind direction. Obtaining a wind direction may comprise determining the wind direction by obtaining loads from the blades with self-powered sensors and using the wind turbine controller with a backup power system to determine the wind direction. In some examples, the wind direction may be directly measured by a wind sensor.

Determining if the wind speed is higher than a predetermined wind speed is represented at block 430. A wind turbine controller may compare a wind speed with a predetermined wind speed. In some examples, determining if the wind speed is higher than a predetermined wind speed may comprise obtaining a wind speed. In some examples, the wind direction may be directly measured by a wind sensor. Wind speed may be directly measured by a self-powered wind sensor or by differential pressure sensors arranged on the nacelle. These sensors may be self-powered and a backup power system may be used to power the wind turbine controller to determine if the wind speed is higher than predetermined wind speed.

Activating the one or more wind flow deflector devices by moving the wind flow deflector devices from a resting position to a deployed position when a grid loss event is detected, a wind speed is higher than a predetermined wind speed and the nacelle is misaligned with respect to the wind direction is represented at block 440. An actuator may be activated when the grid loss event is detected in combination with a misalignment of the nacelle and high wind speeds. The actuator may be powered by a power storage system, e.g. a battery or high-pressure gas storage that allows the actuator to move the wind flow deflector devices from a resting position to a deployed position during a grid loss event.

In some examples, the power storage system may comprise a battery and/or an ultracapacitor. The power storage system may be a backup power system for temporary powering a wind turbine component. For example, the actuator may be activated by a backup power system of a pitch system. The backup power system of a pitch system may comprise a battery and/or an ultracapacitor. In some examples, the actuator may be activated by a dedicated power storage system.

In some examples, the actuator may comprise an electromagnet that retain a plate of a wind flow deflector device in a resting position. During a grid loss event, no power is supplied to this electromagnet and then the plate may thus be (automatically) deployed.

Deploying the wind flow deflector devices when the wind direction and the longitudinal axis of the nacelle are aligned or at low wind speeds may thus be prevented.

During a grid loss event wind direction may change and the nacelle may thus be misaligned. As the nacelle cannot be rotated to follow the changes of the wind direction, the activated wind flow deflector devices may reduce the drag of the nacelle to reduce loads acting on the wind turbine.

In some examples, the method 400 may comprise determining the duration of the grid loss event. Deploying the wind flow deflector devices may thus also take into account the duration of the grid loss events. For example, the wind flow deflector devices may be moved from a resting position to a deployed position only when the duration of the grid loss event is longer than a predetermined duration. According to this aspect, short grid loss events do not deploy the wind flow deflector devices. One or more electromagnets may retain the wind flow deflector devices in a resting position when power is supplied to it. When no power is supplied to the electromagnets, the wind flow deflector devices are allowed to deploy. An energy storage system may still power the electromagnets during a period of time in grid loss event. However, if this period of time is shorter than the duration of the grid loss event, no more power is supplied to the electromagnets. Then, the wind flow deflector devices may be allowed moving from a resting position to a deployed position.

In some examples, a power or an energy storage system may activate the actuator after a predetermined period of time to prevent moving the wind flow deflector device in short grid loss events.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A nacelle assembly for a wind turbine, the nacelle assembly connectable to a wind turbine tower through a yaw system, comprising:

a front region coupled to a rotor comprising a rotor hub and at least one rotor blade;

a nacelle having a cover structure to house wind turbine components, the cover structure comprising a front side arranged at the front region, a rear side opposite to the front side, a first and a second lateral side and a top and a bottom side;

the cover structure extending from the front side to the rear side along a longitudinal axis;

an add-on wind flow deflector system coupled to an outside of the cover structure to guide wind flowing to the nacelle for reducing a drag of the nacelle when a wind direction is misaligned with respect to the longitudinal axis;

the add-on wind flow deflector system comprising one or more deflector devices extending longitudinally along a portion of a first top edge region formed between the top side and the first lateral side or a portion of a second top edge region formed between the top side and the second lateral side; and each deflector device is disposed on the cover structure so as to extend from the respective top edge region and alongside of and at an acute angle relative to the respective lateral side such that each deflector device extends over a portion of the respective lateral side, the respective lateral side extending under the one or more deflector devices completely between the top side and the bottom side, and a terminal distal end edge of each deflector device displaced laterally from the respective lateral side, each terminal distal end edge being a free unattached edge such that an open space is defined around each terminal distal end edge and between the respective lateral side and the respective deflector device.

2. The nacelle assembly according to claim 1, each deflector device comprising a plate extending from a proximal end edge connected to the cover structure to the respective terminal distal end edge.

3. The nacelle assembly according to claim 2, wherein for each deflector device, the proximal end edge is connected to the cover structure at the respective top edge region.

4. The nacelle assembly according to claim 2, wherein each plate is hingedly connected to the cover structure.

5. The nacelle assembly according to claim 2, wherein each plate is curved.

6. The nacelle assembly according to claim 5, wherein the terminal distal edge end of each plate faces the cover structure.

7. The nacelle assembly according to claim 1, wherein one deflector device of the one or more deflector devices comprises a reinforcing structure on an underside thereof connected to the cover structure.

8. A nacelle assembly for a wind turbine having a front region to be coupled to a wind turbine rotor comprising a rotor hub and at least one wind turbine blade, the nacelle assembly comprising:

a nacelle having a cover structure to house wind turbine components, the cover structure having a substantially cuboid shape and comprising:

a front side arranged at the front region;

a rear side opposite to the front side;

a first and a second lateral side extending from the front side to the rear side along a longitudinal axis, wherein the first and the second lateral sides are arranged on opposite sides of the longitudinal axis;

a top and a bottom side extending from the front side to the rear side along the longitudinal axis and from the first to the second lateral sides along a transverse axis perpendicular to the longitudinal axis;

an add-on wind flow deflector system comprising wind flow deflector devices extending along the longitudinal axis, wherein the wind flow deflector devices are coupled to an outside of the cover structure to at least partially cover an underlying portion of the first and the second lateral sides, the first and the second lateral sides underlying the respective deflector devices and extending completely between the top side and the bottom side; and each of the deflector devices disposed on the cover structure so as to extend at an acute angle away from the respective lateral side such that a terminal distal end edge of the deflector device is displaced laterally from the respective lateral side, each terminal distal end edge being a free unattached edge such that an open space is defined around each terminal distal end edge and between the respective lateral side and the respective deflector device.

9. The nacelle assembly according to claim 8, wherein the deflector devices comprise a plate having a proximal end edge coupled to the cover structure.

10. The nacelle assembly according to claim 9, the cover structure comprising:

a first and a second top edge portion respectively formed between the top side and the first and the second lateral sides, and a first and a second bottom edge portion respectively formed between the bottom side and the first and the second lateral sides;

the deflector devices are included in a set of deflector devices comprising:

a first top wind flow deflector device having the respective proximal end edge coupled to the first top edge portion;

a second top wind flow deflector device having the respective proximal end edge coupled to the second top edge portion;

a first bottom wind flow deflector device having the respective proximal end coupled to the first bottom edge portion; and a second bottom wind flow deflector device having the respective proximal end coupled to the second bottom edge portion.

* * * * *